Oct. 27, 1942.　　　　D. O. SCOTT　　　　2,299,932
FLUID OPERATED BRAKE SYSTEM
Filed Oct. 25, 1939　　　　2 Sheets-Sheet 1
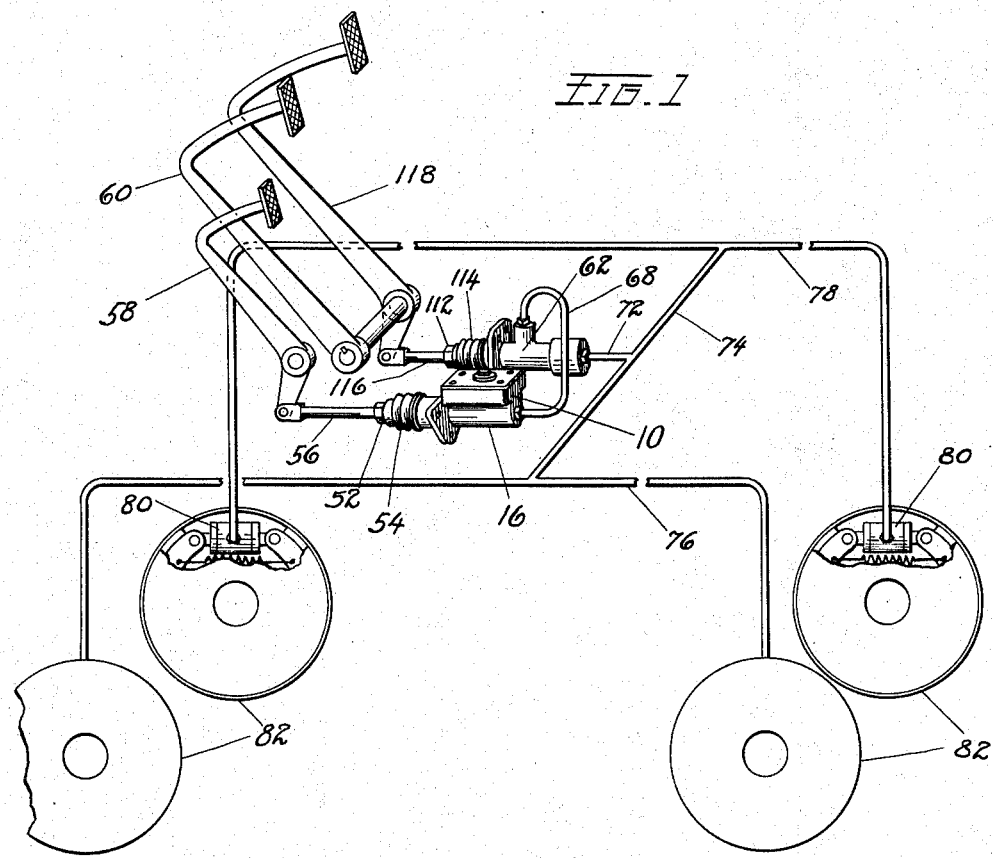
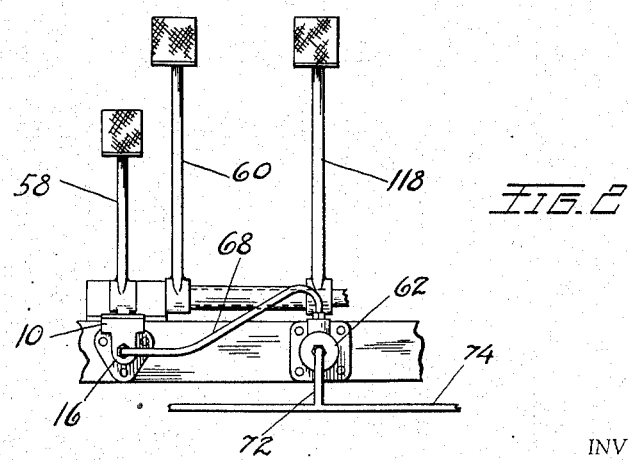
INVENTOR.
DON O. SCOTT
BY
ATTORNEY.

Oct. 27, 1942. D. O. SCOTT 2,299,932
FLUID OPERATED BRAKE SYSTEM
Filed Oct. 25, 1939 2 Sheets-Sheet 2

INVENTOR
DON O. SCOTT
BY
O. H. Fowler
ATTORNEY

Patented Oct. 27, 1942

2,299,932

UNITED STATES PATENT OFFICE 2,299,932

FLUID OPERATED BRAKE SYSTEM

Don O. Scott, Birmingham, Mich., assignor to Hydraulic Brake Company, Detroit, Mich., a corporation of California Application October 25, 1939, Serial No. 301,261

4 Claims. (Cl. 188—152)

This invention relates to brakes, and more particularly to fluid operated brakes for motor vehicles.

Upon adoption by the automotive industry of automatic transmissions, operators of motor vehicles were relieved of the necessity of operating the clutch pedal lever of the vehicle when desirous of reducing the speed of or stopping the vehicle. It is well known that such devices operate automatically, and that because of their automatic operation no effort is required on the part of the operator except to relieve the applied pressure on the accelerator pedal and depress the brake pedal lever. This requires constant shifting of the right foot of the operator from the accelerator pedal to the brake pedal lever. In making these shifts, it is necessary that the operator lift his right foot several inches from the floor board of the vehicle. This imposes unnecessary strain, resulting in fatigue; particularly is this so when operating the vehicle in traffic and when driving long distances.

Furthermore, in the operation of a motor vehicle equipped with a conventional braking system, it is found necessary, when stopping on a hill, for the operator to shift his foot from the accelerator pedal to the brake pedal to prevent the vehicle from rolling backward, and when starting from this position the operator shifts his foot from the brake pedal to the accelerator pedal. In making the latter shift, there is an interval in which the operator has no control over the vehicle, resulting in the vehicle rolling backward; particularly is this a great disadvantage when the vehicle is stopped on a steep incl ne, such as a bank, as is often encountered when turning on a narrow road. It is the aim of the present invention to overcome these difficulties.

In the illustrated embodiment of the invention, a fluid operated brake system including a compression element operated through a foot pedal lever has connected thereto an auxiliary compression element also operated through a foot pedal lever. The auxiliary compression element is connected in the system through the cylinder of the compression element, and the foot pedal lever for operating this auxiliary compression element is preferably mounted for convenient operation by the left foot of the operator. Because of this particular arrangement, it is not necessary when decreasing the speed or stopping the vehicle for the operator thereof to move his right foot back and forth from the accelerator to the brake pedal for efficient operation of the brakes.

Through the introduction into the brake system of an auxiliary compression element and an operating lever therefor, a distinct advantage is gained in that the auxiliary operating means may be efficiently used as an anti-roll-back through which the operator may retain perfect control when stopping the vehicle on a hill or on a steep incline.

The auxiliary compression element may be actuated to effect a light braking operation and also to decrease foot pedal travel of the conventional operating means, which may have been lost through drum expansion, fade-out, or lining wear. Furthermore, the auxiliary compression element may be used to build up pressure in the system so as to increase the effectiveness of the brakes when operated through the conventional foot pedal lever. An important factor of the invention is the selectivity of brake applications and the ease with which the desired result may be attained.

An object of the invention is to provide a fluid operated brake system including selective means for applying the brakes.

Another object of the invention is to provide a fluid operated brake system including an auxiliary compression element operative through a foot pedal lever.

Another object of the invention is to provide a fluid operated brake system for a motor vehicle including an auxiliary operating means which may be used as an anti-roll-back for the vehicle.

Another object of the invention is to provide a fluid operated brake system including a compression element operative through one foot pedal lever, and an auxiliary compression element operative through another foot pedal lever.

A further object of the invention is to provide a fluid operated brake system including the conventional operating means, and a second operating means operative first to effect a comparatively light brake application, and which may be repeatedly operated to increase foot pedal travel of the conventional operating means, both operating means being operative independently or concomitantly, and the first being operative to increase the fluid pressure in the system to render the second operating means more effective.

Other objects and structural details of the invention will be apparent from the subjoined description taken in connection with the accompanying drawings forming a part of this specification, and in which:

Fig. 1 is a diagrammatical illustration of a fluid pressure brake system embodying the invention;

Fig. 2 is a diagrammatical view illustrating the relative position of the operating pedals to the clutch pedal of a motor vehicle;

Figure 3:
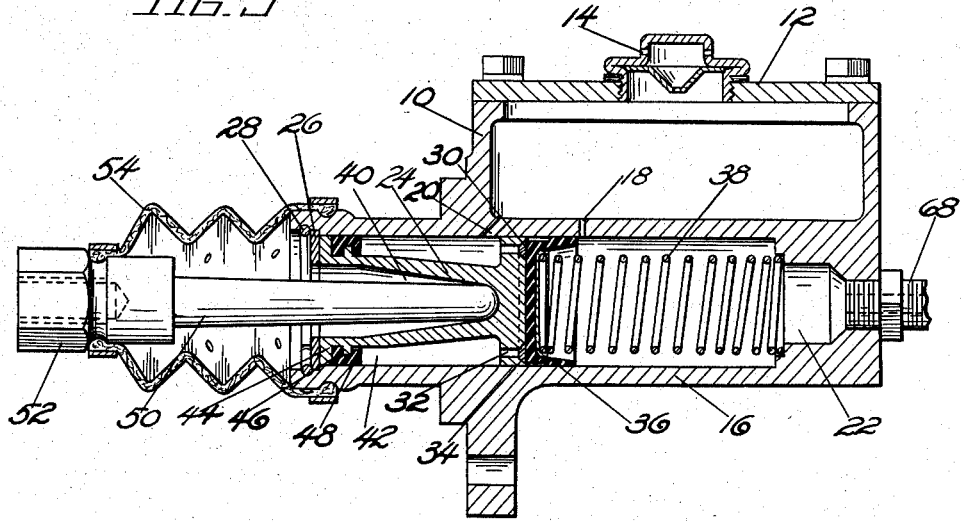
Fig. 3 is a longitudinal sectional view of a master operating cylinder.
Figure 4:
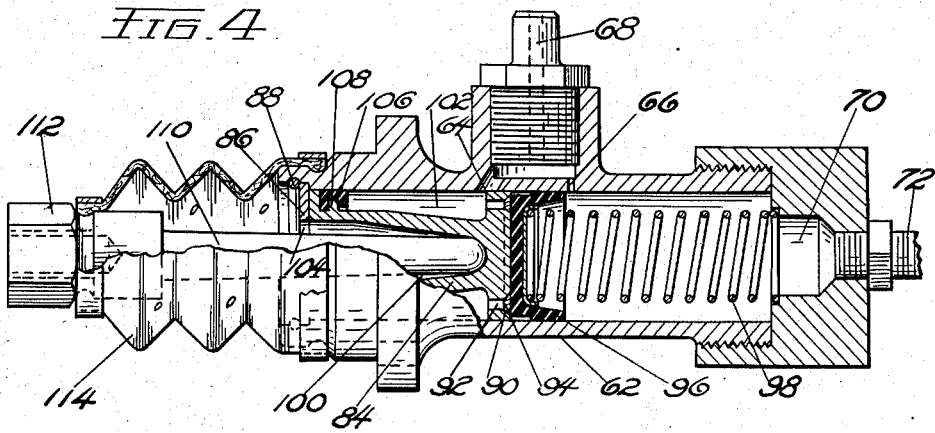
Fig. 4 is a longitudinal sectional view of another actuating cylinder.

Referring to the drawings for more specific details of the invention, 10 represents a reservoir which may be suitably attached to the frame of a motor vehicle chassis. The reservoir has a cover plate 12 provided with a vent 14, and formed in the bottom of the reservoir is a cylinder 16 extending through the wall of the reservoir. The cylinder has ports 18 and 20 providing communications between the cylinder and the reservoir, and a discharge port 22 in the head of the cylinder.

A piston 24 reciprocable in the cylinder 16 is retained against displacement by a washer 26 seated on an annular shoulder in the cylinder and a lock ring 28 seated in a groove in the wall of the cylinder. The head of the piston is provided with a circular groove 30 and a plurality of ports 32 arranged in spaced relation in the groove. The ports provide communications between the face and the back of the piston, and a ring 34 normally seated in the groove 30 controls the ports.

Positioned on the head of the piston is a collapsible sealing cup 36 held against displacement by a coil spring 38 interposed between the cup and the head of the cylinder. The spring also serves to return the piston to its retracted position. A recess 40 is formed in the back of the piston, and the skirt of the piston is reduced in cross-section to provide a chamber 42. The skirt has a flange 44 fitted snugly in the cylinder, and a rib 46 adjacent the flange. The flange provides a seat for a sealing washer 48 and the rib serves to secure the washer against displacement.

A rod 50 inserted in the recess 40 has threaded thereon a coupling 52, and a flexible sleeve or boot 54 connects the coupling to the cylinder to exclude dust from the cylinder. The coupling receives a rod or link 56 pivotally connected to a foot pedal lever 58 arranged to one side of a clutch pedal lever 60. The structure thus far described is quite well known in the art.

A cylinder 62 has inlet ports 64 and 66 communicating with a pipe line or conduit 68 leading from the discharge port 22 in the cylinder 16, and a discharge port 70 communicating with a pipe line or conduit 72. The conduit 72 communicates with a conduit 74, which in turn communicates with conduits 76 and 78 connected to expansible elements or motors 80 for spreading the friction elements of brakes 82 into drum engagement, the friction elements of each brake being connected by a conventional retractile spring.

A piston 84 reciprocable in the cylinder 62 is retained against displacement by a washer 86 seated on an annular shoulder in the cylinder, and a lock-ring 88 for the washer seated in a groove in the wall of the cylinder. The head of the piston has a circular groove 90 and a plurality of spaced ports 92 in the groove 90 providing communications between the face and the back of the piston, and a ring 94 normally seated in the groove controls of the ports 92.

Positioned on the head of the piston is a collapsible sealing cup 96 held against displacement by a coil spring 98 interposed between the cup and the head of the piston. This spring also serves to return the piston to its retracted position. The piston has a recess 100 in its back, and the skirt of the piston is reduced in cross-section to provide a chamber 102. The skirt of the piston has a flange 104 fitted snugly in the cylinder. This flange supports a sealing washer 106 held against displacement by a rib 108 formed on the skirt of the piston adjacent to the flange.

A rod 110 inserted in the recess 100 has thereon a coupling 112 connected by a flexible sleeve or boot 114 to the cylinder. This boot precludes dust and other extraneous substances from the cylinder. The coupling 112 receives one end of a rod 116, the other end of which is pivotally connected to a conventional brake foot pedal lever 118.

In operation, assuming that the system is filled with liquid or fluid, and that the operator desires to apply the brakes, upon depressing the brake foot pedal lever 118 the piston 84 is moved to displace fluid from the cylinder 62 through the conduits 72, 74, 76 and 78 into the expansible elements or motors 80 associated with the brakes 82, resulting in spreading the friction elements of the brakes into drum engagement. During this operation pressure is received on the collapsible sealing cup 96.

Upon release of the applied pressure, the lever 118 is returned to its normal position by a conventional retractile spring, not shown. During this movement of the foot pedal lever, the piston 84 is moved to its retracted position by fluid returning from the motors 80, under the pressure of the retractile springs connected between the friction elements of the brakes, movement of the piston being augmented by the return spring 98.

The operation thus far described is substantially that of a hydraulic brake structure now in general use. In accomplishing this operation it was necessary for the operator to raise his foot from the accelerator to the brake foot pedal lever, thus causing undue strain, resulting in fatigue. Particularly is this apparent in driving long distances and when driving in heavy traffic where repeated braking operations are necessary.

Assuming that the operator stops the vehicle on an upgrade, in doing so he has found it necessary to remove his right foot from the accelerator pedal to depress the brake foot pedal lever. Now, when desirous of starting again, the operator releases the brake and shifts his foot from the brake pedal lever to the accelerator pedal. During this interval of shifting his foot from the brake pedal lever to the accelerator pedal, the operator has lost control, resulting in the vehicle rolling backward. To overcome these difficulties or objections, the auxiliary brake applying means described below is introduced into the system, the arrangement shown being especially suitable for use when the clutch pedal 60 is operated by an automatic clutch control (not shown).

In operating through the auxiliary brake applying means, upon depressing the foot pedal lever 58 to move the piston 24 in the cylinder 16, fluid received by the cylinder from the reservoir 10 is displaced from the cylinder through the discharge port 22, pipe line or conduit 68, and ports 64 and 66 into the cylinder 62, through piston 84 and past cup 96, thence through discharge port 70, pipe lines or conduits 72, 74, 76 and 78 into the motors 80 associated with the brakes, resulting in an effective application of the brakes. In this operation the pressure is received on the collapsible sealing cup 36 and the sealing washer 106.

Upon release of the applied pressure on foot pedal lever 58, this lever is returned to its normal position by a conventional retractile spring, not shown. As the pedal 58 returns to its normal position, the piston 24 is moved to its retracted position by fluid returning from the expansible elements or motors 80, due to pressure imposed by the retractile springs connected between the friction elements of the respective brakes 82. This movement of the piston is augmented by the return spring 38. When the piston 24 moves to its retracted position, the cup 36 uncovers the port 18, and any surplus fluid is returned through cylinder 62, port 66, conduit 68, cylinder 16, and port 18 to the reservoir 10. When the conventional and auxiliary operating means are actuated concomitantly a greater volume of fluid is supplied to the brake system at an increased rate of flow, resulting in a rapid application of the brakes.

Because of the introduction into the brake operating system of an auxiliary operating means of the character herein described, a greater selectivity in operation of the brakes is obtained. It has been found in actual practice that in a brake system including the auxiliary operating means, the conventional operating means is seldom used except in instances where it is desired to stop the vehicle abruptly. Furthermore, the auxiliary operating means may be repeatedly operated to decrease the foot pedal travel of the conventional operating means, which may have been lost through drum expansion or braking lining wear; and in instances where it is desired to hurriedly effect a heavy brake application, as in instances of great danger, the conventional operating means and the auxiliary means may be operative concomitantly.

A marked advantage of the invention is to be found in the use of the auxiliary operating means as an anti-roll-back. When so used, the operator, upon stopping on an up-grade, applies the brake through the auxiliary operating means, and, since this operating means is actuated by the left foot of the operator, his right foot is left free for operating the accelerator. Hence, there is no interval during which the operator has lost control of the vehicle, as is incident to the shifting of the operator's right foot from the conventional brake pedal to the accelerator pedal.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A fluid brake system comprising a reservoir, an auxiliary compression chamber in direct communication with the reservoir, a compression chamber having a discharge port, a fluid channel connecting the two compression chambers, a piston reciprocable in each of the compression chambers, and means for the independent actuation of both pistons in the compression chambers, said piston in the auxiliary compression chamber effective to produce pressure initially or concurrently with the piston in the compression chamber, said piston in the compression chamber effective to maintain pressure on the fluid in the system upon release of the piston in the auxiliary compression chamber after a concurrent movement of the piston.

2. A fluid pressure system comprising a master cylinder, an auxiliary cylinder provided with a reservoir communicating therewith, pistons operative in each of the cylinders for the creation of pressure, a discharge port in the master cylinder, expansible elements connected to the discharge port, and means permitting passage of fluid from the auxiliary cylinder through the master cylinder to the expansible elements upon actuation of the piston in the auxiliary cylinder, said master cylinder piston operative independently of or concomitantly with the auxiliary cylinder piston to deliver fluid under pressure to the expansible elements.

3. A fluid operated brake system comprising a primary compression chamber having a discharge port, an auxiliary compression chamber, a piston reciprocable in each of the chambers for developing pressure, manually operated means for actuating the pistons, expansible elements operated by fluid pressure developed by the pistons, means whereby movement of the piston in the auxiliary compression chamber actuates the expansible elements through the primary compression chamber, and means permitting actuation of either piston in the compression chambers during or after like operation of the other piston to thereby increase the pressure on the fluid to be delivered to the expansible elements.

4. A fluid operated brake system comprising a master cylinder having a discharge port, an auxiliary cylinder provided with a reservoir, pistons reciprocable in the cylinders having manual means for the independent actuation thereof, fluid delivery lines connected to the discharge port, fluid actuators connected to said fluid lines, said piston in the auxiliary cylinder operative to force fluid through the master cylinder into said lines, and means for taking the reaction of the master cylinder piston when the piston in the auxiliary cylinder is actuated with the master cylinder piston in its retracted position, said auxiliary cylinder having one-way communication with the master cylinder past the piston when the master cylinder is operated, so that the auxiliary means may be still operative to add to the pressure in said lines.

DON O. SCOTT.